Patented Sept. 14, 1937

2,092,972

UNITED STATES PATENT OFFICE 2,092,972

PROCESS FOR THE MANUFACTURE OF ALKYL DERIVATIVES OF AMINATED AROMATIC HYDROCARBONS

Bernard Herstein, Brooklyn, N. Y., assignor to U. S. Industrial Alcohol Co., New York, N. Y., a corporation of West Virginia No Drawing. Application September 22, 1936, Serial No. 101,938

8 Claims. (Cl. 260—124)

This application is a continuation in part of my application Serial No. 46,123, filed October 22, 1935.

The invention relates to a process for the manufacture of alkyl derivatives of aminated aromatic hydrocarbons and specifically to the manufacture of alkyl derivatives of aniline or acylated aniline.

Alkyl derivatives of aniline, such as the toluidines or xylidines, etc., are much used intermediates in the chemical industry. They are ordinarily prepared by nitration of the corresponding hydrocarbons followed by reduction of the nitro compounds to amino compounds. Economically, this process has the important disadvantage that on nitration by usual methods a number of different nitro compounds are produced simultaneously, the separation of which is cumbersome and costly.

Thus, to give but one instance: in preparing paratoluidine, toluol is nitrated but the resulting product, as a rule, contains only about one-third of the desired para-nitro-toluol, the balance being principally the ortho-nitro-derivatives with a small percentage of the meta compound. Only by elaborate chemical operations can the three isomers be separated from one another, and it facilitates matters little whether the separation is attempted on the original nitro-compounds or on the mixture of the corresponding amines, which is obtained on reduction.

I have found a process both novel and economical by which alkyl derivatives of aniline and other aromatic amines may be obtained.

For example, there may be prepared by this process para-tertiary butyl aniline, which in most cases can suitably be used for the same purposes as para-toluidine is used, producing compounds of the same general character with some specific properties of their own.

The process comprises subjecting acylated aniline, or other acylated aromatic amines, to the well-known Friedel-Crafts reaction with suitable alkyl halides, more especially alkyl chlorides and bromides, or alkyl hydroxides, in the presence of anhydrous aluminum chloride or its equivalent.

Aniline itself does not lend itself to this reaction, as is well known, the reason among others being its strongly basic character and the general rule that in the Friedel-Crafts reaction hydrochloric acid is liberated copiously.

From available literature records it does not appear that the Friedel-Crafts reaction has ever been applied successfully to aniline or its derivatives.

I have found that acylated aniline, for example acetanilid, lends itself to the Friedel-Crafts reaction with alkyl halides or hydroxides. Most striking results are obtained when acetanilid is reacted with tertiary butyl chloride in presence of aluminum chloride under proper conditions as outlined below, the end product being para-tertiary butyl acetanilid of high purity and excellent yield.

*Example I*

An example of the method of operation is as follows:

34 gms. acetanilid are suspended in 65 cc. ethylene dichloride and 40 gms. AlCl₃ are added. The temperature tends to rise, but, by cooling, is preferably not permitted to go above 50° C. When all but a very small amount of aluminum chloride is in solution the reaction mixture is cooled to about —10° C. and 25.2 gms. tertiary butyl chloride are added. The temperature is maintained at about —5° C. for approximately 30 minutes. At this temperature, the evolution of hydrochloric acid gas is not vigorous and the reaction may be maintained at that temperature at which the evolution of HCl is just visible from the surface of the reaction mixture.

When reaction ceases, the residue is poured gently into 250 gms. of cracked ice, at which point the intermediate formed of AlCl₃ and the organic compound is decomposed by water and the AlCl₃ goes into solution while the para-tertiary butyl acetanilid and ethylene dichloride form a "dough" which is removed and washed two or three times with fresh water to leach out as much inorganic material as possible. The ethylene dichloride is then removed either by boiling directly or by steam distillation. This leaves the product, para-tertiary butyl acetanilid, behind in a crystalline mass which may be filtered and washed and subsequently dried. The average weight of the material thus obtained is 45–46 gms.

In the above example, it will be noted that the reaction has been carried out in a medium of ethylene dichloride which merely acts as an inert diluent and prevents the reaction from proceeding at too rapid a rate, which would adversely influence both yield and quality of the product. Other inert media, however, may be used, preferably only such as will give a homogeneous reaction mixture, for instance nitrobenzene, methylene dichloride, trichlorethylene or chloroform, to some extent also carbon disulfid.

For the same reason it is advisable to keep the temperature as low as is conducive to a uniform and controllable speed of reaction, thus insuring fair yield and reasonable purity of first reaction product.

On the other hand, a certain latitude is permissible in proportion, temperature, and in the order of mixing the ingredients, provided only that the tertiary butyl chloride is not brought in direct and sole contact with aluminum chloride, under which conditions, as is well known, a vigorous reaction takes place, the butyl chloride being decomposed rapidly into butylene and hydrochloric acid.

Example II

Instead of alkyl halides, similar alkyl hydroxides may be reacted in like manner with acylated aromatic amines. Thus under somewhat modified conditions acetanilid may be reacted with tertiary butyl alcohol to form para-tertiary butyl acetanilid. In this instance the procedure is as follows:

34 gms. acetanilid (¼ mol.) are dissolved in 100 cc. ethylene dichloride and 66 gms. aluminum chloride (½ mol.). This results in a temperature rise of about 40° C. After cooling to about −5° C., 18.5 gms. tertiary butyl alcohol are added and the reaction mixture permitted to warm up. First sign of evolution of HCl occurs at +16° C. Reaction is allowed to proceed at this temperature for 1 hour and then for an additional hour at 16 to 30° C. (gradual rise over the hour period).

Decompose with about 300 gms. finely chopped ice and wash with water. Ethylene dichloride is then removed by ordinary distillation and the residue filtered. The residue is boiled once more with water to extract free acetanilid, filtered and dried. The product is para-tertiary butyl acetanilid.

Dry weight 28 gms.
Per cent theory 58.5.

Example III

Preparation of secondary butyl acetanilid:

34 gms. acetanilid, 65 cc. ethylene dichloride, 40 gms. anhydrous aluminum chloride are mixed together. Solution takes place with evolution of heat. When almost all the AlCl₃ is in solution, the contents of the flask are cooled to −10° C. and 23.1 gms. secondary butyl chloride added. Evolution of HCl gas begins at about −8° C. but is preferably allowed to proceed at −2° or −3° C. for 5 minutes to increase rate of evolution, after which it completes itself at −10° C. Reaction time 30 minutes.

Decompose with water and ice, wash the oil by decantation and remove ethylene dichloride by boiling. Resultant product is an oil which gives a mushy solid on standing for several days. By crystallizing from isopropyl ether a white crystalline body melting at 121–122° C. is obtained, with a nitrogen content of 7.34 per cent, theory demanding 7.33%.

Example IV

Preparation of tertiary butyl o-methyl acetanilid:

37.25 gms. acetyl-o-toluidine (¼ mol.), 65 cc. ethylene dichloride, 40 gms. anhydrous aluminum chloride are mixed in a flask with attached condenser. Liquefaction sets in immediately and temperature rises to about 50° C. Only a small part of the AlCl₃ remains undissolved. This homogeneous solution is cooled to −5° to −10° C. and 27 cc. (¼ mol.) tertiary butyl chloride are added. Usually, evolution of hydrochloric acid begins at −6° C. and temperature is kept at such a point as will permit gas to evolve at a moderate rate. This is continued for approximately 30 minutes, after which the reaction mixture is poured on ice (about 250–300 gms.). The oil resulting from this is washed about three times with 200 cc. portions of fresh water to remove aluminum chloride and is then boiled with 200 cc. H₂O to remove ethylene dichloride. The remaining oil solidifies on cooling to a solid cake. This is ground in a mortar, washed with water and dried. Average yield of crude—48 gms.

On purifying this crude by crystallization from an appropriate solvent, for instance isopropyl ether, two products are obtainable having different melting points, although their elementary analysis gives identical figures. Thus their nitrogen contents in both cases was found to be 6.83 per cent while theory for tertiary butyl acettoluidid demands 6.92 per cent nitrogen. This would indicate the formation of isomers.

Example V

Preparation of isopropyl acetanilid:

On reacting 34 gms. acetanilid, 65 cc. ethylene dichloride, and 40 gms. anhydrous aluminum chloride with 20 gms. isopropyl chloride in the usual way (at −8° C.), decomposing the product with water, etc., an oil is obtained which shows some tendency to solidify after many days. Purification of this solid for the purpose of isolating the expected isopropyl acetanilid is extremely difficult and yields, at best, are very poor. However, if instead of using one equivalent of isopropyl chloride four such equivalents are used, in other words if instead of 20 gms. isopropyl chloride 80 gms. are employed of this material, the reaction proceeds with ease at −15° C. and is completed after about 30 minutes.

The reaction product is treated as above for removal of AlCl₃ and ethylene dichloride, leaving behind a solid, somewhat tacky to the touch, which after recrystallization from aqueous alcohol twice gives a substance melting sharply at 140.5° C. to 141° C. All the analytical data obtained point to the formation of tri-isopropyl acetanilid as indicated by elementary analysis:

|  | Found | Theory |
|---|---|---|
|  | Percent | Percent |
| Carbon | 78.35 | 78.20 |
| Hydrogen | 10.48 | 10.39 |
| Nitrogen | 5.55 | 5.36 |

Example VI

A number of experiments were made with the view of preparing isoamyl acetanilid and using the following proportions:

| | | |
|---|---|---|
| Acetanilid | gms | 34 |
| Ethylene dichloride | cc | 65 |
| Anhydrous aluminum chloride | gms | 40 |
| Isoamyl chloride | gms | 27 |

The procedure was followed as in preceding examples and in a number of cases conditions of temperature, time of reaction and proportions of raw materials used were varied. Practically in every case the final product, as purified, was identified as para tertiary butyl acetanilid instead of the expected isoamyl derivative. The melting point was 161–162° C. and remained practically unchanged when mixed with an equal quantity of authentic para tertiary butyl acetanilid. The nitrogen content of the purified product was found to be 7.27% (theory for butyl acetanilid is 7.33%) while the theoretical percentage of nitrogen in amyl acetanilid remains 6.85%.

It will be noted that the end products of the examples above described are alkyl derivatives of acylated aniline and especially of acetanilid or its homologues. The reaction, apparently, is of generic character and capable of considerable variation, which latter is within the purview of this application.

By deacylating (deacetylating) these products according to standard methods, the corresponding amines are obtained. Both the aromatic alkyl acylamines and the aromatic alkyl amines obtainable by this method are valuable intermediates in the manufacture of dyestuffs and for other purposes.

I claim:

1. A process for the preparation of alkyl derivatives of aromatic amines, which comprises the step of reacting an acylated aromatic amine, in the presence of anhydrous aluminum chloride, with a compound selected from the group consisting of alkyl halides and alkyl hydroxides.

2. A process for the preparation of alkyl derivatives of aromatic amines, which comprises the step of reacting an acylated aromatic amine with an alkyl halide in the presence of anhydrous aluminum chloride.

3. A process for the preparation of alkyl derivatives of aniline, which comprises the step of reacting acylated aniline with a compound selected from the group consisting of alkyl halides and alkyl hydroxides, in the presence of anhydrous aluminum chloride.

4. A process for the preparation of alkyl derivatives of acetanilid, which comprises the step of reacting acetanilid with a compound selected from the group consisting of alkyl halides and alkyl hydroxides, in the presence of anhydrous aluminum chloride.

5. A process for the preparation of alkyl derivatives of aromatic amines, which comprises reacting an acylated aromatic amine, in the presence of anhydrous aluminum chloride, with a compound selected from the group consisting of alkyl halides and alkyl hydroxides, and deacylating the resulting aromatic alkyl acylamine to obtain the corresponding aromatic alkyl amine.

6. A process for the preparation of a butyl derivative of acetanilid, which comprises reacting acetanilid with tertiary butyl alcohol in the presence of anhydrous aluminum chloride.

7. A process for the preparation of a butyl derivative of acet-toluidid, which comprises reacting acetyl-o-toluidine with tertiary butyl chloride in the presence of anhydrous aluminum chloride.

8. A process for the preparation of a propyl derivative of acetanilid, which comprises reacting acetanilid with isopropyl chloride in the presence of anhydrous aluminum chloride.

BERNARD HERSTEIN.